No. 763,447. PATENTED JUNE 28, 1904.
W. M. WADLEIGH.
HARVESTER ATTACHMENT FOR RAISING AND SAVING DOWN GRAIN.
APPLICATION FILED JULY 25, 1903.
NO MODEL.
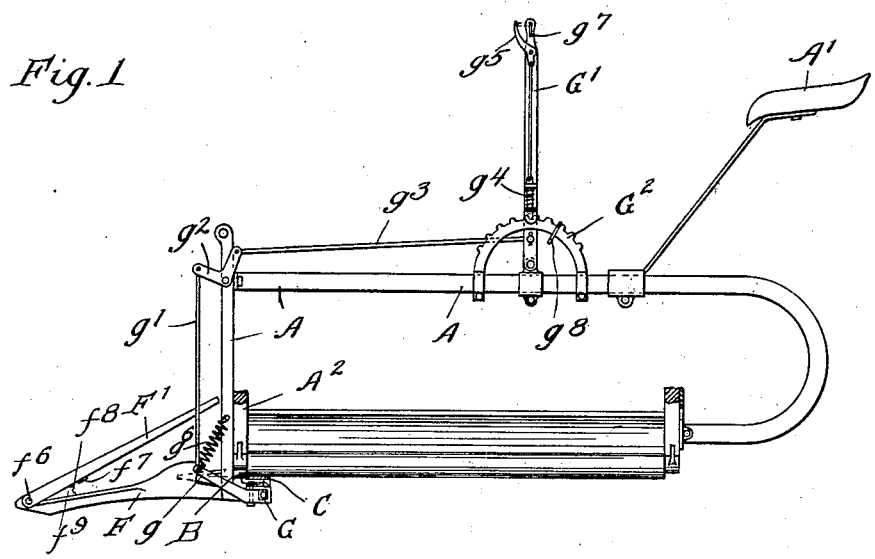
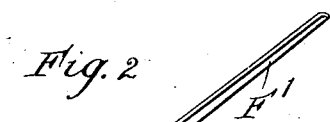
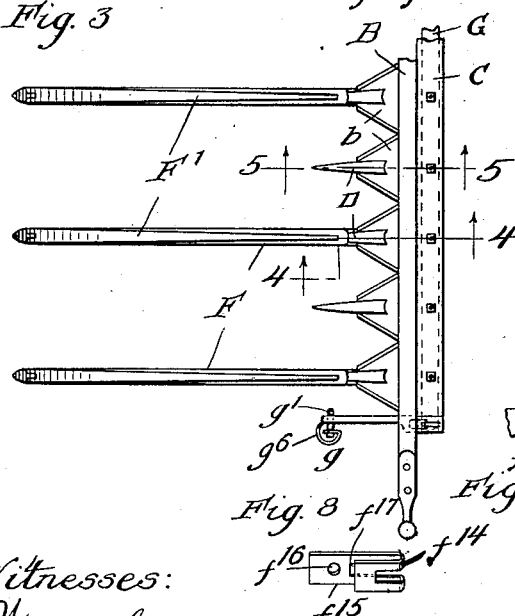
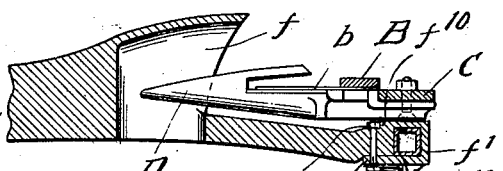
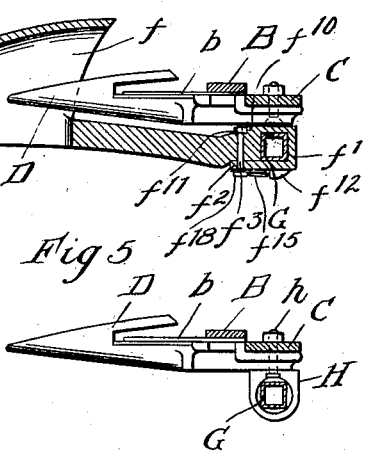
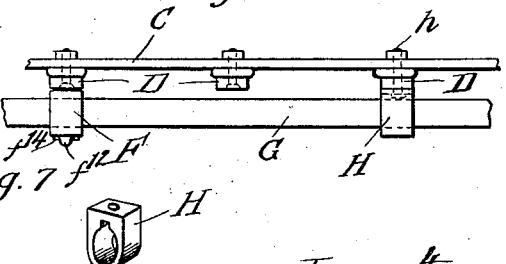
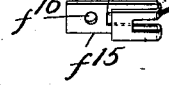
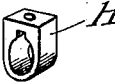
Witnesses:
Wm Geiger
A. H. Munday
Inventor:
William M. Wadleigh
By Munday, Evarts & Adcock.
Attorneys
THE NORRIS PETERS CO., PHOTO-LITHO., WASHINGTON, D. C.

No. 763,447. Patented June 28, 1904.

UNITED STATES PATENT OFFICE.

WILLIAM M. WADLEIGH, OF CHICAGO, ILLINOIS.

HARVESTER ATTACHMENT FOR RAISING AND SAVING DOWN GRAIN.

SPECIFICATION forming part of Letters Patent No. 763,447, dated June 28, 1904.

Application filed July 25, 1903. Serial No. 166,948. (No model.)

*To all whom it may concern:*

Be it known that I, WILLIAM M. WADLEIGH, a citizen of the United States, residing in Chicago, in the county of Cook and State of Illinois, have invented a new and useful Improvement in Harvester Attachments for Raising and Saving Down Grain, of which the following is a specification.

My invention relates to harvesters, reapers, and other machines for cutting grains, seed-grasses, and other crops, and more particularly for attachments thereto for raising and saving down grain.

My present invention is an improvement upon the grain raising and saving attachments for harvesters heretofore patented to me in Letters Patent Nos. 607,099 and 607,100, both of July 12, 1898, and No. 733,442, of July 14, 1903; and the object of this invention or improvement is to provide means for facilitating the attachment of my elevating-guards to the harvester and at the same time to enable the dip or downward inclination of the supporting-arms of my elevating-guards to be varied or adjusted from time to time at the will of the operator or driver of the harvester, as the different conditions of grain may require in different portions of the field.

My invention consists in the means I employ to practically accomplish this object or result—that is to say, it consists in combination with the finger-bar and finger-guards of a harvester of journal-blocks secured to the finger-bar and finger-guards beneath the same, a rocking bar or shaft mounted in said journal-blocks, a series of elevating-guards having each an elevating-arm and a lower or supporting arm secured to said rocking bar or shaft and provided with a slot or socket to receive the finger-guard, and an operating-lever and connections to enable the operator or driver to vary or adjust the dip or downward inclination of the elevating-guards or their supporting-arms as occasion may require.

My invention also consists in the novel construction of parts and devices and in the novel combinations of parts and devices herein shown or described, and more particularly pointed out in the claims.

In the accompanying drawings, forming a part of this specification, Figure 1 is a side elevation, partly in vertical section, of a device embodying my invention. Fig. 2 is a detail elevation of one of the elevating-guards, showing the rocking bar or shaft to which it is attached in cross-section. Fig. 3 is a detail plan view showing a portion of the finger-bar with finger-guards and elevating-guards attached. Fig. 4 is an enlarged detail vertical section through one of the elevating-guards. Fig. 5 is a detail vertical section adjacent to the end finger-guard and showing one of the journal-blocks. Fig. 6 is a detail rear elevation showing a portion of the finger-bar and a portion of the rocking bar or shaft to which the elevating-guards are attached. Fig. 7 is a detail perspective view of one of the journal-blocks, and Fig. 8 is a detail perspective view of the nut-lock.

In the drawings, A represents a portion of the framework of a grain-binding harvester or like machine, A' the operator's or driver's seat, and $A^2$ the elevator.

B is the sickle-bar; $b$, the sickle-blades.

C is the finger-bar, D the ordinary finger-guards in which the sickle reciprocates, and F F' are my elevating-guards, the same being preferably applied to each alternate finger-guard on the finger-bar, although a greater or less number may be used. The lower or supporting arms F of each elevating-guard are rigidly secured to a rocking bar or shaft G, which extends underneath the finger-bar and finger-guards and is journaled or mounted to rock or turn in journal-blocks H, which are secured by bolts $h$ beneath the finger-bar and finger-guards, one at each end of the finger-bar, and also one or more intermediate ones, if desired. Each of the elevating-guards comprises a lower or supporting arm F and a pivotal and adjustable elevating-arm F'. The lower or supporting arm F is provided with an upper vertical slot or socket $f$ to receive the point or nose of the finger-guard D and permit the elevating-guard to be vibrated up or down, as may be required, and it is also provided with a socket $f'$, preferably square or rectangular, to receive and secure the same to the rocking bar or shaft G, which is preferably square or rectangular in cross-section.

nections between the same and said operating-arm, and a pawl and ratchet for holding the operating-lever in position, substantially as specified.

5. In a harvester, the combination with a finger-bar and finger-guards, of journal-blocks removably secured to the finger-bar underneath the same, a rocking bar mounted to turn in said journal-blocks, a series of elevating-guards having each an elevating-arm and a supporting-arm rigidly attached to said rocking bar and provided with a slot or socket to receive the finger-guard, an operating-arm on the rocking bar, an operating-lever and connections between the same and said operating-arm, said elevating-arms of the elevating-guards being pivotally connected to their supporting-arms and provided with lock-bolts engaging notched ribs on the supporting-arms, substantially as specified.

6. In a harvester, the combination with a finger-bar, of journal-blocks removably secured thereto underneath the same, a rocking bar mounted to turn in said journal-blocks, a series of elevating-guards having each an elevating-arm and a supporting-arm rigidly attached to said rocking bar, an operating-arm on the rocking bar, and an operating-lever and connections between the same and said operating-arm, each of said supporting-arms having a vertical slot or socket to receive the point or nose of a finger-guard, substantially as specified.

7. In a harvester, the combination with a finger-bar and finger-guards, of journal-blocks removably secured to the finger-bar underneath the same, a rocking bar mounted to turn in said journal-blocks, a series of elevating-guards having each an elevating-arm and a supporting-arm rigidly attached to said rocking bar and provided with a slot or socket to receive the finger-guard, an operating-arm on the rocking bar and an operating-lever and connections between the same and said operating-arm, said supporting-arm of each elevating-guard being provided with a socket $f'$ having a clamping-strip $f^2$ to embrace said rocking bar, and a clamp-bolt $f^3$, substantially as specified.

8. In a harvester, the combination with a finger-bar and finger-guards, of journal-blocks removably secured to the finger-bar underneath the same, a rocking bar mounted to turn in said journal-blocks, a series of elevating-guards having each an elevating-arm and a supporting-arm rigidly attached to said rocking bar and provided with a slot or socket to receive the finger-guard, an operating-arm on the rocking bar and an operating-lever and connections between the same and said operating-arm, said supporting-arm of each elevating-guard having a shoulder $f^{12}$ and being provided with a socket $f'$ having a clamping-strip $f^2$ to embrace said rocking bar, a clamp-bolt $f^3$, and a nut-lock $f^{15}$ having a folded end $f^{14}$ abutting against said shoulder $f^{12}$ on the supporting-arm, and a free end abutting against the head of said bolt $f^3$ to prevent its turning, substantially as specified.

WILLIAM M. WADLEIGH.

Witnesses:
H. M. MUNDAY,
WILLIAM A. GEIGER.